US010754753B1

(12) United States Patent
Cogley

(10) Patent No.: US 10,754,753 B1
(45) Date of Patent: Aug. 25, 2020

(54) PERFORMANCE OF VIRTUAL MACHINE INSTANCES USING MACHINE RECOGNITION OF SCREENSHOT IMAGES

(71) Applicant: Amazon Technologies, Inc., Seattle, WA (US)

(72) Inventor: Sean Michael Cogley, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 177 days.

(21) Appl. No.: 15/635,491

(22) Filed: Jun. 28, 2017

(51) Int. Cl.
*G06F 11/34* (2006.01)
*G06F 9/455* (2018.01)
*G06F 11/30* (2006.01)

(52) U.S. Cl.
CPC ...... *G06F 11/3409* (2013.01); *G06F 9/45558* (2013.01); *G06F 11/301* (2013.01); *G06F 2009/45591* (2013.01); *G06F 2009/45595* (2013.01)

(58) Field of Classification Search
CPC ............ G06F 9/45558; G06F 9/45533; G06F 2009/45591; G06F 2009/45595; G06F 11/3409; G06F 11/301; G06F 11/3055; G06F 11/32; G06F 11/321; G06F 11/323; G06F 11/3065; G06F 11/3466; G06F 11/079; G06F 11/0793; G06F 11/006; G06F 11/0712; G06F 11/0769
See application file for complete search history.

(56) References Cited

U.S. PATENT DOCUMENTS

| 7,237,154 B1* | 6/2007 | Zorian | G11C 29/56008 714/711 |
| 7,430,568 B1* | 9/2008 | DeKoning | G06F 11/0727 |
| 8,332,688 B1* | 12/2012 | Tompkins | G06F 11/1438 714/13 |
| 9,361,199 B2* | 6/2016 | Ren | G06F 11/301 |
| 10,063,644 B1* | 8/2018 | Pai | H04L 67/26 |
| 2003/0037288 A1* | 2/2003 | Harper | G06F 11/079 714/37 |
| 2006/0156157 A1* | 7/2006 | Haselden | G06F 11/0793 714/746 |
| 2008/0229151 A1* | 9/2008 | Ito | B60W 50/04 714/37 |
| 2013/0227350 A1* | 8/2013 | O'Riordan | G06F 11/3476 714/45 |

(Continued)

Primary Examiner — Emerson C Puente
Assistant Examiner — Zhi Chen
(74) Attorney, Agent, or Firm — Lee & Hayes, P.C.

(57) ABSTRACT

Technologies are disclosed for automatic troubleshooting of virtual machine (VM) instances in a service provider network. A health checker service determines that a VM instance is in a non-responsive state. At least one screenshot image generated by the VM instance is obtained from a screenshot service. The at least one screenshot image is evaluated with respect to at least one reference screenshot image of a plurality of reference screenshot images by a recognition service. The at least one screenshot image is matched with a reference screenshot image of the plurality of reference screenshot images by the recognition service to provide a type of the at least one screenshot image. At least one responsive action is performed by the health checker service based at least in part upon the type of the at least one screenshot image.

20 Claims, 12 Drawing Sheets

(56) References Cited

U.S. PATENT DOCUMENTS

| | | | |
|---|---|---|---|
| 2014/0101489 A1* | 4/2014 | Yang | G06F 9/45558 714/38.13 |
| 2016/0080830 A1* | 3/2016 | Kim | H04N 21/485 725/19 |
| 2016/0124741 A1* | 5/2016 | Hu | H04L 67/34 717/171 |
| 2016/0127509 A1* | 5/2016 | Uriel | H04L 61/103 709/203 |
| 2018/0095845 A1* | 4/2018 | Sanakkayala | H04L 43/10 |
| 2018/0210774 A1* | 7/2018 | Young | G06F 3/14 |

* cited by examiner

3:18
Wednesday, January 13

Press CTRL + ALT + DELETE to log on

FIG. 2

PERFORMANCE OF VIRTUAL MACHINE INSTANCES USING MACHINE RECOGNITION OF SCREENSHOT IMAGES

BACKGROUND

Some network-based computing service providers allow users to purchase and utilize computing resources, such as virtual machine ("VM") instances, on an on-going or as-needed basis. In addition to VM instances, such computing service providers typically allow customers to purchase and utilize other types of computing resources. For example, customers might be permitted to purchase access to and use of file and block data storage resources, database resources, networking resources, and other types of computing resources. Utilizing these computing resources as building blocks, customers of such a network-based computing services can create custom solutions that provide various types of functionality, such as application hosting, backup and storage, content delivery, World Wide Web ("Web") hosting, enterprise information technology ("IT") solutions, database services, and others.

VM instances may enter a non-responsive or "bad" state. For example, a VM instance may be unreachable by a user via, for example, a secure shell ("SSH") protocol or a MICROSOFT® remote desktop protocol ("RDP"). Such unreachability may be related to or associated with an operating system being utilized to operate the VM instance. Generally, no information is gathered with respect to circumstances related to the occurrence of the unreachable instance. Furthermore, a user may not be monitoring or paying attention to operation of the VM instance. For example, the VM instance may be performing a large computing job and thus, if a problem arises with the VM instance, the user may not be aware of the problem. Thus, the VM instance may be utilizing various computing resources, but not achieving any results.

The disclosure made herein is presented with respect to these and other considerations.

BRIEF DESCRIPTION OF THE DRAWINGS

FIGS. 2-6 schematically illustrate examples of reference screenshot images that may be used to identify a screenshot image using a recognition service of the service provider network of FIG. 1, according to one particular configuration;

DETAILED DESCRIPTION

Figure 1:
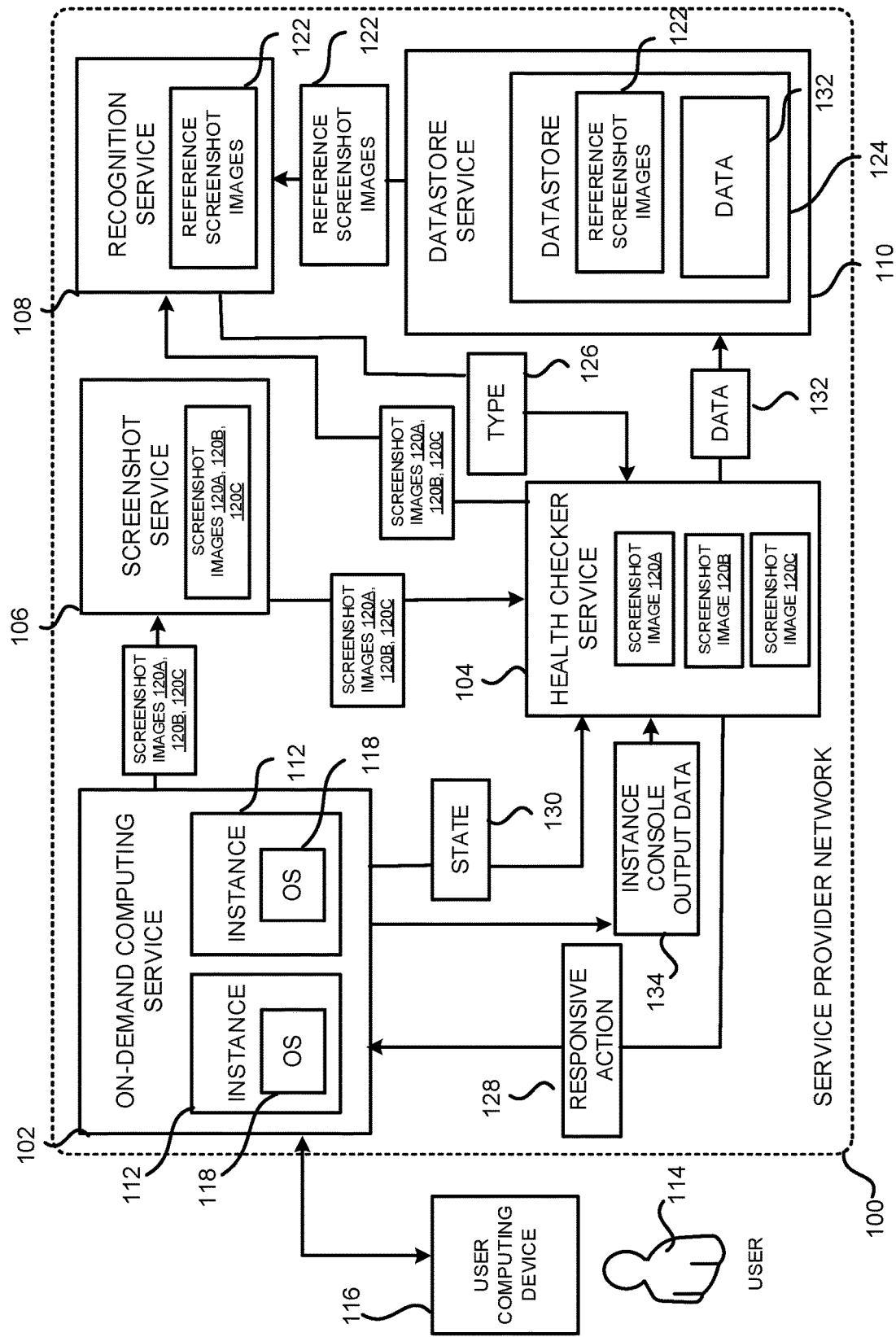
FIG. 1 is a software and network architecture diagram illustrating aspects of the configuration and utilization of a service provider network that includes an on-demand computing service, a health checker service, a screenshot service and a recognition service, according to one particular configuration.

The following detailed description is directed to technologies for troubleshooting a VM instance that has entered a non-responsive or "bad" state, e.g., the VM instance is unreachable, to thereby improve performance of the VM instance. Through an implementation of the disclosed technologies, an image of a screenshot ("screenshot image") associated with the current state of the impacted VM instance is obtained. The obtained screenshot image may then be matched with a reference screenshot image from multiple reference screenshot images. The reference screenshot images are images that are obtained from VMs while in a non-responsive state. Once the obtained image is matched with a reference screenshot image, responsive actions, including troubleshooting, may be performed so that the VM instance may leave the non-responsive state and enter a responsive or "good" state, e.g., become reachable. While the technologies described herein are described with respect to VM instances, the technologies described herein are also useful with respect to hardware computers.

Through implementation of the disclosed technologies, non-responsive VM instances may be identified more quickly and thus, may be corrected more quickly, thereby minimizing unproductive use of resources by the VM instance. For example, the impacted VM instance may more quickly stop using as many CPU cycles or as much power without providing any results. Furthermore, service for users of non-responsive VM instances may be improved by providing quicker recovery of the VM instances. Indeed, in some situations, the non-responsive state of VM instances may be detected and fixed before users even realize there is a problem with the VM instance. Furthermore, manual intervention for detection and correction of the impacted VM instances may be reduced and even eliminated. The detection and correction of the impacted VM instances may be handled in a matter of minutes versus a greater length of time of up to as much as multiple days since manual intervention may not be needed. Technical benefits other than those specifically mentioned herein can also be realized through an implementation of the disclosed technologies.

In order to enable the functionality disclosed herein, a health checker service operating in a service provider network that provides various computing and network services monitors VM instances provided by an on-demand computing service also operating in the service provider network. When a VM instance is determined to be in a non-responsive state, the health checker service asks for a screenshot image of the VM instance from a screenshot service in the service provider network. The screenshot represents a screen image associated with the VM instance that may or may not be displayed on a display of a computing device. For example, if a user of the VM instance is currently accessing the VM instance with a computing device, then the screenshot may be displayed on a display of the user's computing device. However, if a user or any other party, e.g., a party associated with an operator of the service provider network, is not currently accessing or monitoring the VM instance, then the screenshot may not be displayed on any display of a computing device. If the VM instance is non-responsive or unreachable, then the user is not able to access the VM instance to figure out why the VM instance is non-responsive.

Once the screenshot image is obtained, the screenshot image may be provided to a recognition service operating in the service provider network. The recognition service can implement a neural network that has been trained to recognize screenshot images based upon reference screenshot images stored in a data store provided by a data store service of the service provider network. The reference screenshot images pertain to various screenshots that have been captured from VM instances while in various non-responsive states. Thus, matching the screenshot image with a reference screenshot identifies a status of the VM instance in the non-responsive state.

When the screenshot image has been matched with one of the reference screenshot images, the recognition service notifies the health checker service. Based upon the identified status of the VM instance associated with the identified screenshot, the health checker service determines potential problems associated with the identified screenshot image. Based upon the potential problems, the health checker service may perform various responsive actions. For example, the health checker service may attempt to correct the problem and place the impacted VM instance in a responsive or "good" state. Thus, if there are multiple potential problems, then the health checker service may attempt to correct a first potential problem. Once a potential solution for correcting the first potential problem has been performed, the health checker service may obtain another screenshot image for the VM instance and have the recognition service evaluate it to see if the screenshot image has changed and no longer matches the original matched reference screenshot image. The health checker service can continue to attempt to correct the potential problems until a subsequent screenshot image no longer matches the original matched reference screenshot image.

Additional responsive actions may include, but are not limited to, obtaining data surrounding the circumstances of the VM instance entering the non-responsive state. For example, a time of day, a day of the week, a month, operations the VM instance was performing, etc., when the VM instance entered the non-responsive state may be gathered. The data may be stored in a data store and may be accessible by other services and/or parties associated with the service provider network in order to determine various factors that may be impacting the VM instances.

In some configurations, the responsive actions may include contacting a party, e.g., an engineer, associated with the service provider network. The contacted party can then attempt to troubleshoot the VM instance and correct any problems associated with the VM instance.

In some configurations, the matched screenshot may include active icons, e.g., icons that change or move. In such a scenario, multiple screenshot images may be obtained in order to provide a history of the state of the VM instance. For example, an operating system of the VM instance may be updating and/or configuring various files associated with the operating system. This can take a long time. Thus, if it is determined from the screenshot image that the operating system of the VM instance is currently performing updates and/or configuration of files, then it may not be desirable to take corrective action in order to allow the updating and configuration to complete. For example, it may not be desirable to reboot the VM instance. Thus, the multiple screenshot images may be evaluated to determine if active icons on the screenshot are indeed active or are inactive, thereby indicating a non-responsive state for the VM instance. If the VM instance is in a non-responsive state, the corrective action may include rebooting the VM instance. Additional details regarding the various components and processes described briefly above for troubleshooting a VM instance that has entered a non-responsive state will be presented below with regard to FIGS. 1-12.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram illustrating aspects of a service provider network 100 that includes an on-demand computing service 102, a health checker service 104, a screenshot service 106, a recognition service 108, and a data store service 110. In a configuration, the health checker service 104, the screenshot service 106 and the recognition service 108 may be a single integrated service that provides the services and operations described herein. As discussed briefly above, the service provider network 100 is a computing network configured to provide computing services (which might be referred to simply as resources) on a permanent or as-needed basis.

Among other types of functionality, the computing services provided by the service provider network 100 can be utilized to implement various types of network services. The computing services provided by the service provider network 100 can include various types of computing resources, such as data processing resources like virtual machine (VM) instances 112, networking resources, data communication resources, network services, and the like.

A user 114 of the service provider network 100 can utilize an appropriate computing system, such as the user computing device 116, to communicate with the service provider network 100 over an appropriate data communication network (not illustrated in FIG. 1). In this way, the user 114 of the service provider network 100 can configure various aspects of the operation of the computing resources provided by the service provider network 100, or to otherwise control any computing resources being utilized by the user 114. For example, and without limitation, the computing system utilized by the user 114 of the service provider network 100 can be utilized to obtain computing resources in the service provider network 100, to configure aspects of the operation of the computing resource, to access and utilize functionality by the various services and systems described herein, and/or to perform other types of functionality with regard to the operation of the computing resources provided by the service provider network.

The computing device 116 can be any type of computing device capable of connecting to the service provider network 100 via a suitable data communications network such as, but not limited to, a laptop or desktop computer, a tablet computing device, a server computer, a smartphone, etc. Administrative users employed by an owner or operator of the service provider network 100, such as administrators managing the operation of the service provider network 100, can also connect with, manage, and utilize resources provided by network services executing within the service provider network 100 in a similar fashion. Additional details regarding the configuration and operation of the service provider network 100 will be provided below with regard to FIGS. 9-12.

Once the user 114 has configured various computing resources as desired, one or more VM instances 112 may be instantiated by the on-demand computing service 102. During configuration of the computing resources, the user 114 may have provided or identified an operating system ("OS") 118 for use with the one or more VM instances 112. In some configurations, an operator of the service provider network 100 may provide the OS 118 for use with the VM instances 112.

When the VM instances 112 are being utilized, the VM instances 112 may be computing and processing data. While processing and computing the data, the user 114 may not be monitoring the VM instances 112 and thus, the VM instances 112 may be simply operating and performing various functions. In other situations, the user 114 may be monitoring and/or accessing the VM instances 112 via the computing device 116.

The health checker service 104 can monitor a state 130 of the VM instances 112 of the on-demand computing service 102. The health checker service 104 may determine that a VM instance 112 has entered a non-responsive or "bad" state. For example, the VM instance 112 may be unreachable, e.g., the VM instance 112 is not responding to network communications originating from the health checker service, other services, the user 114, etc. Responsive to such a determination, the health checker service 104 may obtain screenshot images 120 from the screenshot service 106. The screenshot images 120 are images of screenshots that may be displayed on a display of a computing device, e.g., computing device 116. In some configurations, the screenshot images 120 are images of a virtual desktop system running on the VM instance 112. More particularly, the screenshot images 120 are a capture of video output generated by the VM instance 112, e.g., a screen view for a display of the computing device 116. The health checker service 104 may make an application programming interface ("API") call to the screenshot service 106 to request the screenshot images 120. The screenshot service 106 may utilize a script to obtain screenshot images 120. In some configurations, the screenshot images 120 are in JPEG format. In a configuration, the on-demand computing service 102 may perform its own health checking service. Thus, in such a configuration, the on-demand computing service 102 may determine that a VM instance 112 has entered a non-responsive or "bad" state, e.g., unreachable. The on-demand computing service 102 may inform the health checker service 104 of the non-responsive or bad state of the VM instance 112.

In response to the non-responsive state of the VM instance 112, the health checker service 104 may obtain and provide a first screenshot image 120A to the recognition service 108. The health checker service 104 may make an API call to the recognition service 108 to provide the screenshot image 120A and request that the recognition service 108 determine a type 126 of the screenshot 120A. In some configuration, the screenshot service 106 may provide the screenshot image 120 directly to the recognition service 108.

In some configuration, the recognition service 108 may evaluate the screenshot image 120A with respect to one or more reference screenshot images 122 until the type 126 of the screenshot image 120A is determined by matching the screenshot image 120A with one of the reference screenshot images 122. The reference screenshot images 122 may be stored in a data store 124 provided by the data store service 110. In a configuration, the recognition service 108 may perform an evaluation of the screenshot image 120A with respect to the reference screenshot images 122 by performing a pixel-by-pixel comparison of the screenshot image 120A with each of the reference screenshot images 122 until a match is made.

In some configurations, the recognition service 108 may be trained to recognize various objects, text, etc. in order to recognize the screenshot images 120. In such configurations, the recognition service 108 is a deep neural network that may be trained to recognize/detect objects in images. Such a deep neural network may be trained network using the reference screenshot images 122. After being trained, the network can then identify screenshot images 120. Thus, the recognition service 108 may evaluate screenshot images 120, without comparing the screenshot images 120 to reference screenshot images 122, in order to recognize objects, text, etc. in order to identify the screenshot images 120.

Once the recognition service 108 matches or identifies the screenshot image 120A with one of the reference screenshot images 122, the recognition service 108 can inform the health checker service 104 as to the type 126 of the screenshot image 120A and a status of the VM instance 112 that relates to the non-responsive state of the VM instance 112. As will be discussed further herein, examples of identities 126 of screenshot images can include, but are not limited to, a log on screen, an OS boot manager screen, a getting ready screen, an update screen, and a console check service screen. Another example of a screenshot image is a screenshot of a VM instance 112 that is totally frozen or down. Such a screenshot is generally indicated by a blank screen, which may be of a particular color. For example, with some operating systems, such a screen may be a solid blue screen. The screenshot may also include some text depending on the OS 118

Once the health checker service 104 knows the type 126 of the screenshot image 120A, the health checker service 104 can initiate one or more responsive actions 128. In some configurations, the responsive action 128 may include taking one or more corrective actions. For example, the health checker service 104 may determine one or more potential problems associated with the type 126 of the screenshot image 120A. The health checker service 104 may then attempt to correct a problem associated with the screenshot image 120A.

The health checker service 104 may then obtain a second screenshot image 120B to determine if the corrective action corrected the problem and returned the VM instance 112 from a non-responsive state to a responsive state, i.e. the screenshot image 120B is different from the screenshot image 120A and no longer matches the type 126 of the screenshot image 120A. If not, then the health checker service 104 may attempt a second corrective action related to another potential problem associated with the screenshot image 120A.

Once the second corrective action has been performed, the health checker service 104 may once again obtain a third screenshot image 120C from the screenshot service 106 and have the recognition service 108 determine if the screenshot image 120C has changed and no longer matches the type 126 of the screenshot image 120A. If the screenshot image has changed, then the problem has been rectified and the VM instance 112 should return to a responsive state. If not, the health checker service 104 may continue to attempt various corrective actions associated with the potential problems associated with the type 126 of the screenshot image 120A.

If no corrective action fixes the problem (or if the screenshot image 120 is not matched with any reference screenshot images), an alert may be generated and sent by the health checker service 104 to a party associated with an operator of the service provider network 100, e.g., an engineer, alerting the party to the impacted VM instance 112. In some configurations, the reactive action 128 may include notifying the party associated with the operator of the service provider network 100 so that the party can manually troubleshoot and take appropriate action with respect to the impacted VM instance 112 due to a severity of the type 126 of the screenshot image 120A.

In some configurations, the responsive action 128 can include gathering data 132 related to the circumstances surrounding the transition of the VM instance 112 to the non-responsive state. Such data 132 can include, for example, time of day, day of the week, month, season of the year, operations that were being performed by the VM instance 112 at the time of the transition, etc. The gathered data 132 may be stored in the data store 124 provided by the data service 110.

The data 132 can be accessed and mined to provide information relating to what is impacting the VM instances 112 of the on-demand computing service 102. For example, it may be determined that a vendor of the OS 118 for some of the VM instances 112 provides updates and configuration files on the first Tuesday of the month at a particular time. Thus, it may be determined that during such a time period, when the screenshot image 120A is matched with an update or configuration reference screenshot image 122, corrective action should be delayed for at least a predetermined amount of time to allow for the updates and configurations to be completed as this is a likely cause of VM instances 112 being in a non-responsive state at this time. Once the predetermined amount of time has passed, it may be determined that it is necessary to take corrective action, e.g., reboot VM instances 112, since the VM instances may be in a non-responsive state.

In some configurations, in response to the type 126 of a screenshot image 120 matching a reference screenshot image 122 that includes moving or changing icons, multiple screenshot images 120 may be obtained over a period of time. The multiple screenshot images 120 may provide a history of the screenshot images 120 that may be analyzed by the health checker service 104 in order to determine if the icons on the screenshot images 120 are indeed changing or moving over the period of time. If the icons are not changing or moving, then the health checker service 104 may determine that the VM instance 112 is non-responsive and corrective action may be taken, e.g., the VM instance 112 may be rebooted by the health checker service 104.

Figure 4:
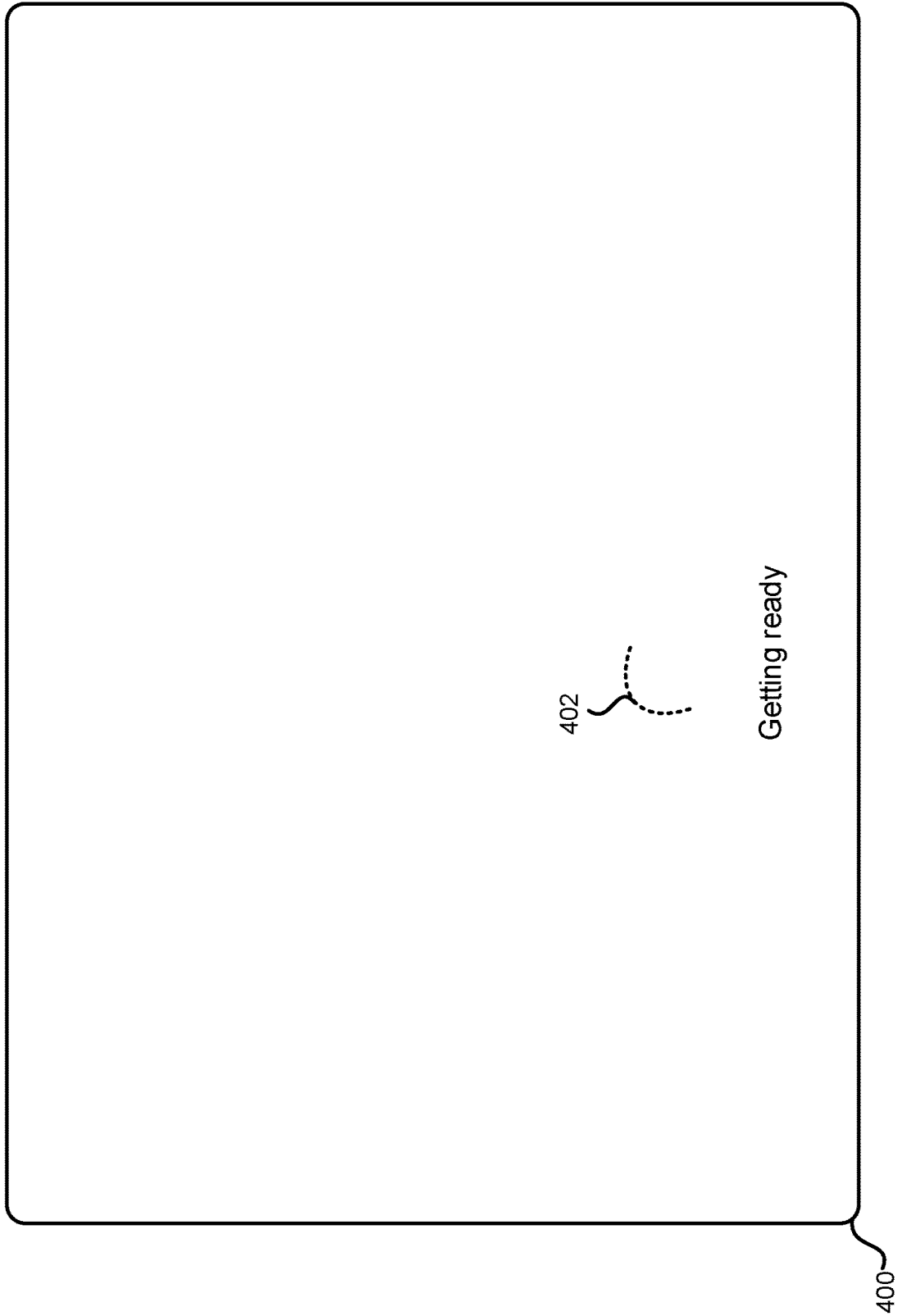
Figure 5:
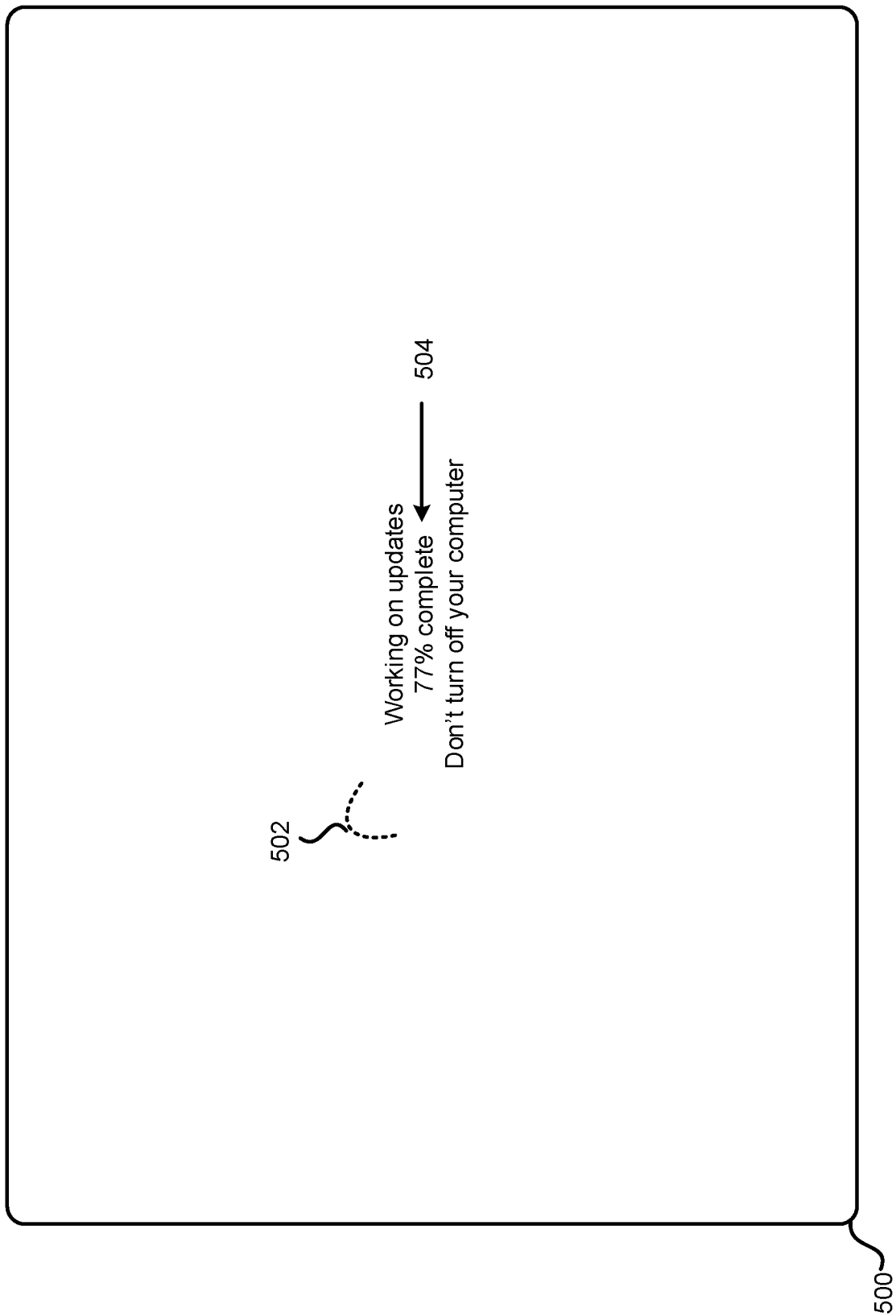

If the health checker service 104 determines that the type 126 of the multiple screenshot images 120 is related to an action that takes a long period of time to complete, then no corrective action may be immediately taken to allow for the action to complete. For example, as previously mentioned, an update and configuration screen may indicate that the VM instance 112 is being updated and/or configured. The update and configuration screen may include moving or changing icons that indicate the updates and/or configurations are being performed. Since this may take a long period of time, the health checker service 104 may wait at least a predetermined amount of time to take corrective action even if the icons are still moving or changing. For example, even if the icons are still moving or changing, the health checker service 104 may reboot the VM instance 112 after the predetermined amount of time since this may indicate that the VM instance 112 is in a non-responsive state. FIGS. 4 and 5 provide examples of moving icons.

If the type of the screenshot image 120A indicates that VM instance 112 is non-responsive, then the corrective action may include rebooting the instance 112. Other corrective actions include, for example, obtaining a back-up copy of the VM instance 112 or relaunching a new VM instance 112.

In some configurations, the health checker service 104 may also obtain instance console output data 134 for use in determining a state 130 and or type 126 of a screenshot image 120, and in determining responsive actions 128. The use of instance console output data 134 may be in addition to, or in place of, using the screenshot image recognition techniques described herein. In a configuration, the health checker service 104 may make an API call to the on-demand computing service 102 to request obtain the instance console output data 134.

Depending on the OS 118 of the VM instance 112, the instance console output data 134 relates to the exact console output that would normally be displayed on a physical monitor attached to a computer, e.g., the user computing device 116. The instance console output data 134 may be buffered because the VM instance 112 produces instance console output data 134 and then posts the instance console output data 134 to a data store. For some OSs 118, the instance console output data 134 relates to display of the last three system event log errors. Thus, the instance console output data 134 may comprise textual data. In some configurations, the instance console output data 134 may include information identifying the state 130 of the VM instance 112. In some configurations, there may be no instance console output data 134, which may be an indication of an error relating to booting up of the VM instance 112. Other possible errors that may be determined using instance console output data 134 include, but are not limited to, memory errors, device errors, kernel errors, file system errors, operating system errors, etc.

FIGS. 2-6 schematically illustrate examples of reference screenshot images 122 that may be used to identify a screenshot image 120 by the recognition service 108. Other screenshot images may be used as reference screenshot images 122 and the examples of FIGS. 2-6 are not meant to be limiting.

FIG. 2 illustrates an example of an "OS Log On" (also "OS logon" or "OS login") screenshot image 200 that provides instructions for logging on to a VM instance 112 according to the OS 118 of the VM instance 112. If the VM instance 112 enters a non-responsive state, e.g., becomes unreachable, during log on, then a potential problem may involve a network configuration or a remote desktop service feature of the OS 118. Possible corrective actions can include, for example, verifying that a security port for accessing a security group is available. Furthermore, there may be an error in connecting to the correct public internet protocol (IP) address that needs to be corrected.

An additional problem may be that an access control list is blocking access to the VM instance 112. Additionally, there may be problems associated with a virtual private network (VPN) configuration, e.g., connectivity. Also, a firewall of the OS 118 may be blocking connections to the VM instance 112. Responsive actions 128 may include corrective actions of correcting the IP address, fixing the connectivity and adjusting the firewall.

Additionally, the log on screen scenario can cause the VM instance 112 to be unresponsive if the log on process is utilizing large amounts of central processing unit (CPU) cycles. The CPU utilization may even be at a maximum limit. Thus, a potential solution may be to wait until the CPU utilization goes down and then attempt to log on. The high CPU utilization may be caused by updates, an update or configuration, a security software scan, a custom start-up script, a task scheduler, etc.

Figure 3:
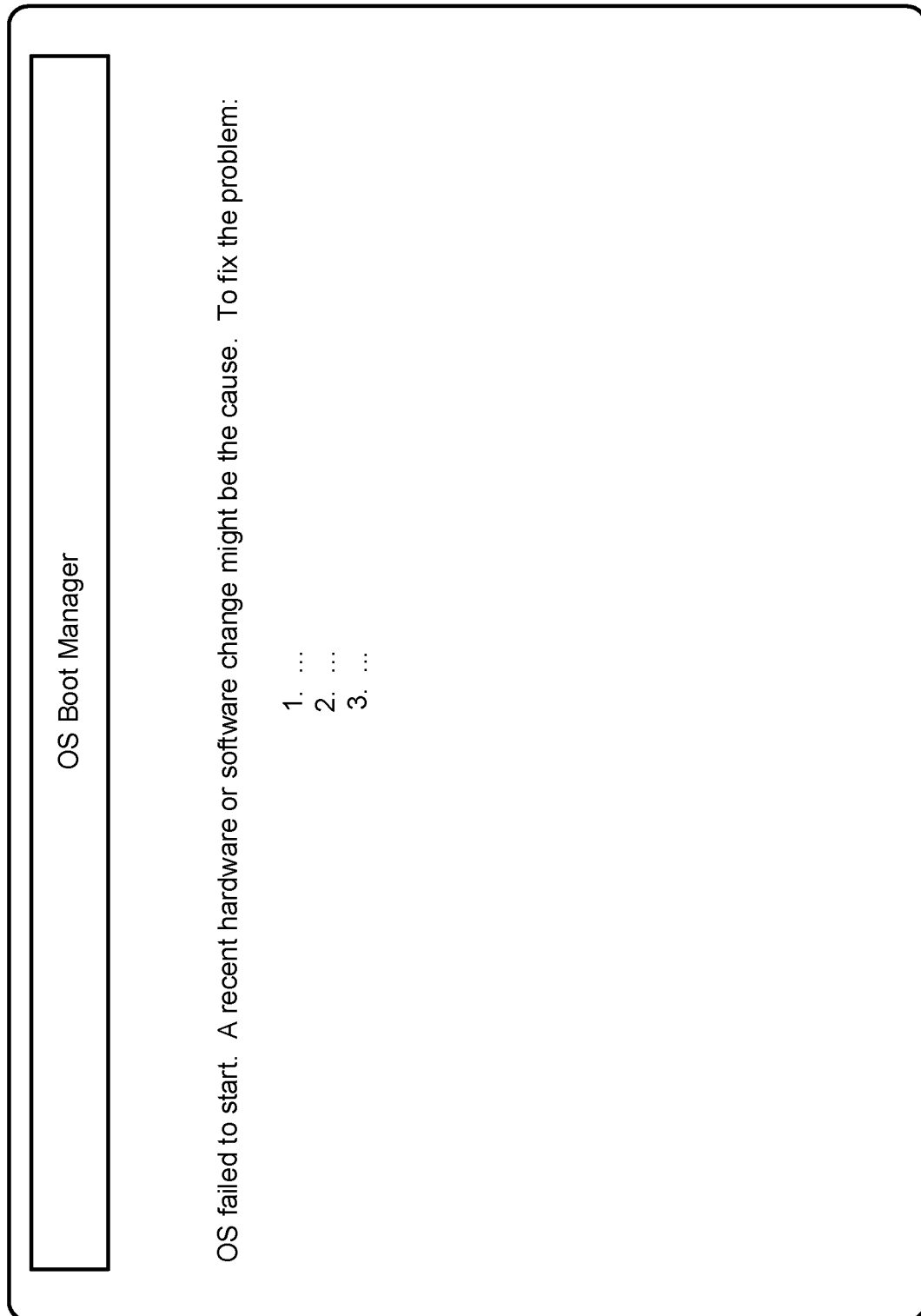

FIG. 3 illustrates an example of an "OS Boot Manager" screenshot image 300. If a VM instance 112 has this screen when in an unresponsive or unreachable state, it may indicate that the OS 118 experienced a fatal corruption in the system file and/or the registry. Thus, a potential reactive action 128 may include recovering the VM instance 112 from a recent back-up. Alternately, a replacement instance 112 may be launched by the on-demand computing service 102.

FIG. 4 illustrates an example of an OS "Getting Ready" screenshot image 400. If the VM instance 112 is in an unresponsive or unreachable state and the Getting Ready screen image 400 is identified as the screenshot image 120, then a potential solution to the problem may include refreshing the screenshot to verify that the screenshot is changing. For example, the dots 402 in the screenshot image 400 may be rotating or otherwise moving to indicate that the VM instance 112 is actually getting ready and that the VM instance 112 is making progress in "getting ready." Thus, the dots 402 represent an example of a moving or changing icon previously referenced with respect to FIG. 1.

If the dots 402 are not moving, this may be an indication that the VM instance 112 is stuck at the OS boot process. A possible solution may include rebooting the VM instance 112. If rebooting does not solve the problem, then the VM instance 112 may be recovered from a recent back-up or may be relaunched as a replacement VM instance 112. Additionally, if the OS boot process exceeds a predetermined amount of time, this may be an indication that the VM instance 112 is stuck at the OS boot process. A possible solution may include rebooting the VM instance 112. If rebooting does not solve the problem, then the VM instance 112 may be recovered from a recent back-up or may be relaunched as a replacement VM instance 112.

FIG. 5 illustrates an example of an OS "Update Screen" screenshot image 500 that indicates that the OS 118 is performing updates and/or configurations. Dots 502 may rotate or otherwise move to indicate that the updates and/or configurations are progressing. Additionally, an indicator 504 may be included to indicate a level of completion. The indicator may change 504 may change as the level of completion progresses. Thus, the dots 502 and indicator 504 represent examples of moving or changing icons previously referenced with respect to FIG. 1. Generally, it is desirable to wait for the updates and/or configurations to finish. If, however, the dots 502 and/or indicator 504 stop changing, e.g., moving or updating, or the update process exceeds a predetermined amount of time, this may indicate that the VM instance 112 is in a non-responsive state. In such a situation, it may be desirable to reboot the VM instance 112.

Figure 6:
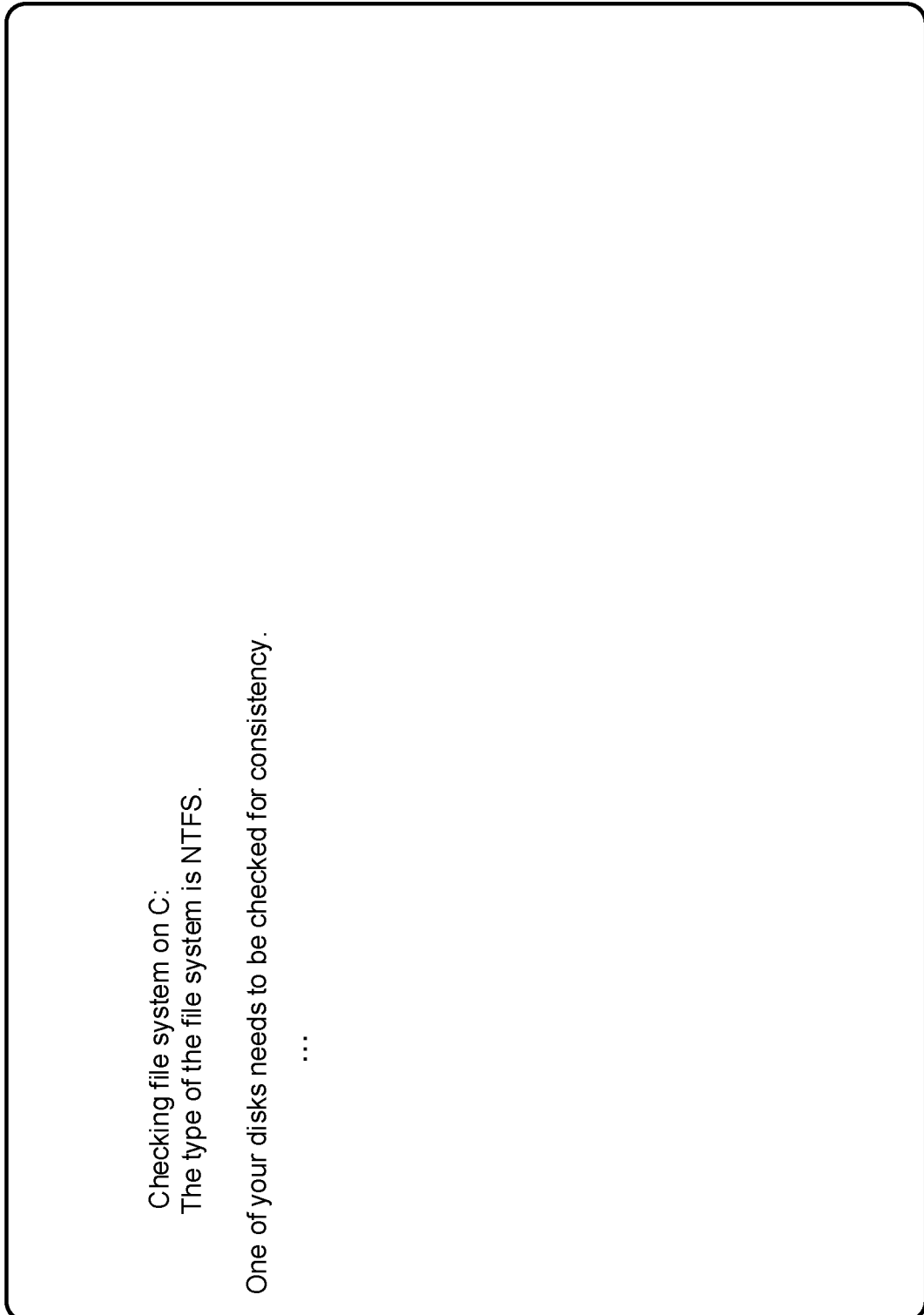

FIG. 6 illustrates an example of a "Console Check Service" screenshot image 600 relating to a check system tool for checking the OS 118 of the VM instance 112. The check system tool verifies file system integrity and fixes logical file system errors. Thus, it is desirable to wait for the system check tool to complete its operation. If, however, after a predetermined amount of time, the check system tool has not finished, this may indicate that the VM instance 112 is in a non-responsive state. Thus, it may be desirable to reboot the VM instance 112.

Figure 7:
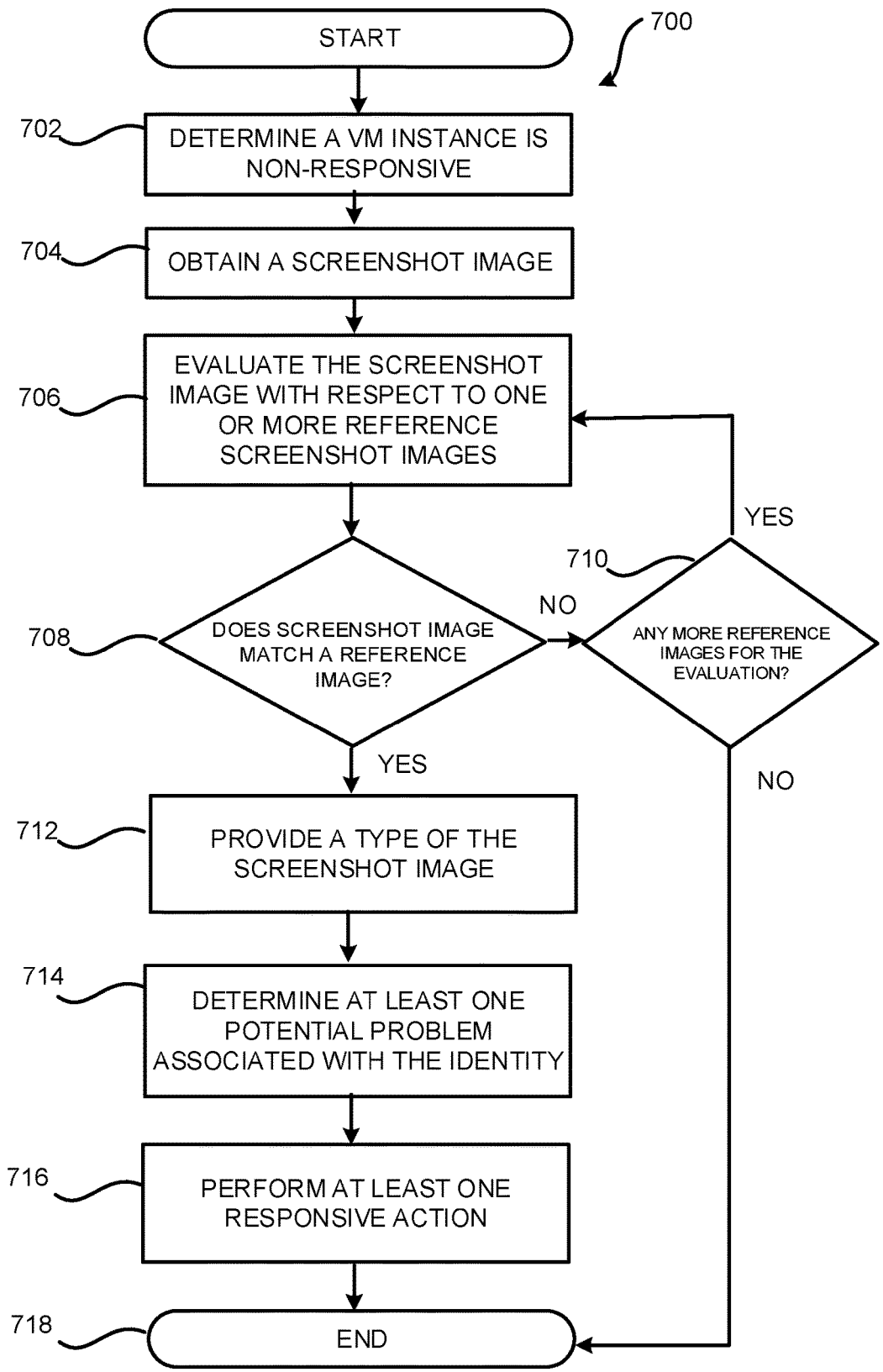
FIG. 7 is a flow diagram illustrating a routine that shows aspects of one mechanism disclosed herein for identifying a screenshot image of a non-responsive VM instance and performing a responsive action, according to one particular configuration.
Figure 8:
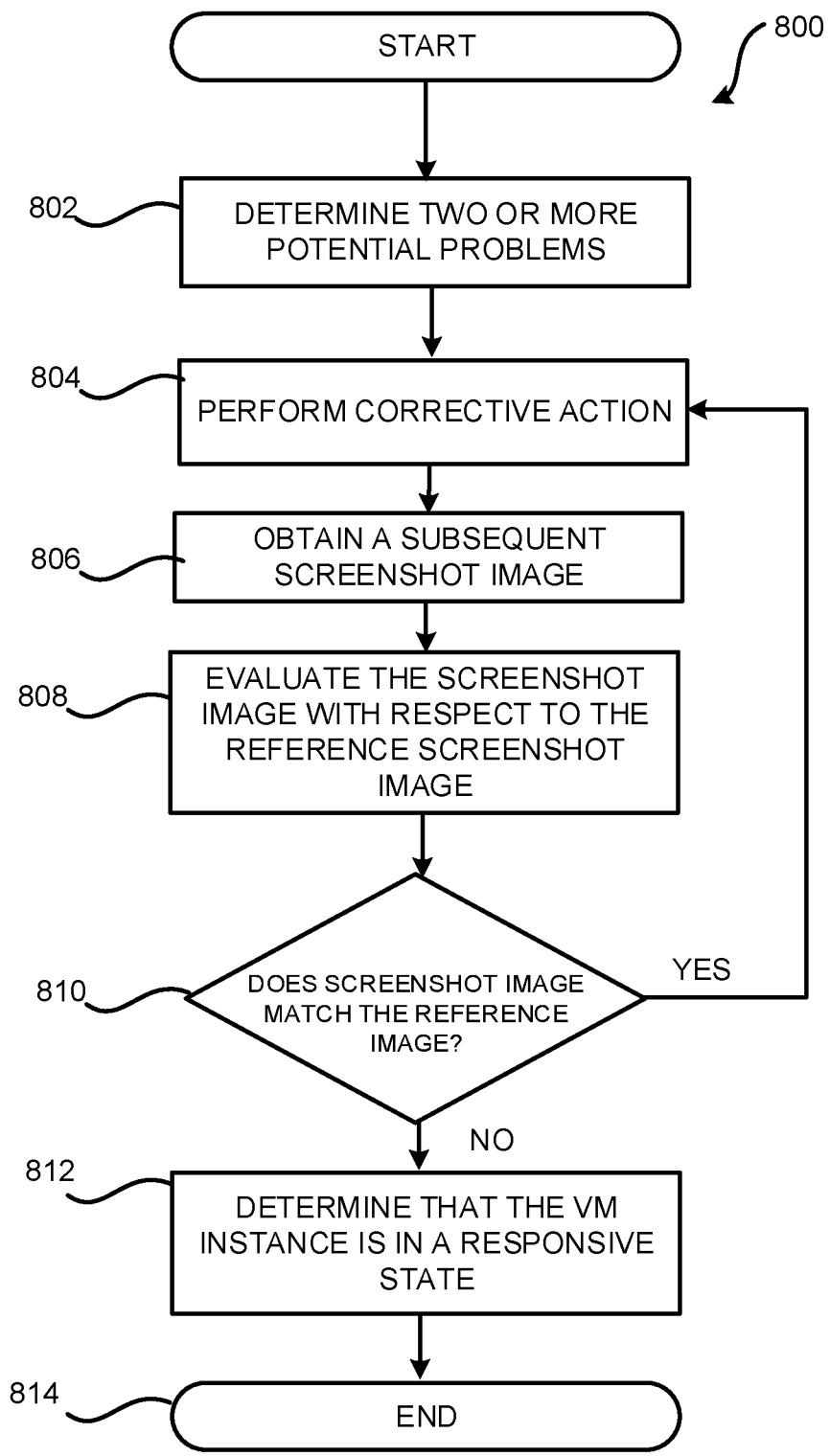
FIG. 8 is a flow diagram illustrating a routine that shows aspects of one mechanism for performing a responsive action that comprises performing one or more corrective actions until a non-responsive VM instance is in a responsive state after a first screenshot image has been identified by matching the first screenshot image with a reference screenshot image, according to one particular configuration.

FIGS. 7 and 8 are flow diagrams illustrating a routine 700 that illustrate aspects of identifying a screenshot image, e.g., screenshot images 120, of a non-responsive VM instance, e.g., VM instances 112, and performing a responsive action, e.g., responsive action 128, illustrated in FIG. 1, and a routine 800 that illustrates aspects of performing a responsive action in the form of multiple corrective actions to change the state of the VM instance to responsive, respectively. It should be appreciated that the logical operations described herein with respect to FIGS. 7 and 8, and the other FIGs. can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than illustrated in the FIGS. and described herein. These operations can also be performed in parallel, or in a different order than those described herein. Some or all of these operations can also be performed by components other than those specifically identified.

The routine 700 begins at operation 702, where it is determined that a VM instance 112 is in a non-responsive state. The determination may be made, for example, by the health checker service 104. At operation 704, a screenshot image is obtained. The screenshot image may be obtained by, for example, the screenshot service 106 at the request of the health checker service 104. The health checker service 104 may make an API call to the screenshot service 106 to request the screenshot images 120. Once the screenshot image is obtained, the health checker service 104 may make an API call to, for example, the recognition service 108 and provide the screenshot image to the recognition service 108.

From operation 704, the routine 700 proceeds to operation 706, where the screenshot image is evaluated with respect to one or more reference screenshot images, e.g., reference screenshot images 122, by the recognition service. At operation 708, it is determined if the screenshot image matches a reference screenshot image. If no, then the routine 700 proceeds to operation 710, where it is determined if there are any more reference screenshot images for the evaluation of the screenshot image. If yes, the routine 700 returns to operation 706, where the screenshot image is evaluated with respect to reference screenshot images. If no, then the routine 700 proceeds to operation 718, where it ends. Since the screenshot image was not matched, and hence, not identified, an alert may be generated and sent by the health checker service 104 to a party associated with an operator of the service provider network 100, e.g., an engineer, alerting the party to the impacted VM instance 112.

If the screenshot image matches a reference screenshot image, the routine 700 proceeds from operation 708, to operation 712, where a type, e.g., type 126, of the screenshot image is provided from the recognition service to the health checker service based upon the matching of the screenshot image with a reference screenshot image. At operation 714, at least one potential problem associated with the type is determined by the health checker service. At operation 716, at least one responsive action, e.g., responsive action 128, is performed by, for example, the health checker service 104.

As previously noted the responsive action may include gathering data, e.g., data 132, associated with circumstances related to the virtual machine instance entering the non-responsive state. The data may be stored in, for example, the data store 124 provided by the data store service 110. The responsive action may also include performing one or more corrective actions based upon the at least one potential problem, as discussed herein with respect to FIG. 1 and will be further discussed herein with reference to FIG. 8. The routine 700 ends at operation 718.

FIG. 8 is a flow diagram illustrating a routine 800 that illustrates aspects of performing a responsive action, e.g., responsive action 128, that comprises performing one or more corrective actions until a non-responsive VM instance, e.g., VM instance 112, is in a responsive state after a first screenshot image, e.g., screenshot image 120A, has been identified by matching the first screenshot image with a reference screenshot image, e.g., reference screenshot image 122, as previously described herein with respect to FIGS. 1 and 7.

The routine 800 begins at operation 802, where two or more potential problems are determined, by, for example, the health checker service 104 based upon the type of the first screenshot image. At operation 804, a corrective action is performed by, for example, the health checker service 104 based upon the two or more potential problems.

At operation 806, a subsequent screenshot image, e.g., screenshot image 120B or 120C, is obtained by the health checker service 104 from, for example, the screenshot service 106. At operation 808, the subsequent screenshot image may be evaluated with respect to the reference screenshot image that matched the first screenshot image. At operation 810, it is determined if the subsequent screenshot image matches the reference screenshot image that matched the first screenshot image.

If the subsequent screenshot image does not match, then the routine 800 proceeds to operation 812, where it is determined that the VM instance is in a responsive state. If the subsequent screenshot image does match, then the routine 800 proceeds back to operation 804, where a subsequent corrective action may be performed based upon the two or more potential problems. From operation 812, the routine 800 proceeds to operation 814, where it ends.

Thus, by obtaining screenshot images 120 related to non-responsive VM instances 112, recognizing the screenshot images 120 and troubleshooting the non-responsive VM instances 112 based upon the recognized screenshot images 120, non-responsive VM instances 112 may be identified more quickly and thus, may be corrected more quickly, thereby minimizing use of resources by the VM instances 112 for nothing. For example, the impacted VM instance 112 may more quickly stop using CPU cycles, but not providing any results. Furthermore, service for users 114 of non-responsive VM instances 112 may be improved by providing quicker recovery of the VM instances 112.

Indeed, in some situations, the non-responsive state of VM instances 112 may be detected and fixed before users 114 even realize there is a problem with a VM instance 112. Furthermore, manual intervention for detection and correction of the impacted VM instances 112 may be reduced and even eliminated. The detection and correction of the impacted VM instances 112 may be handled in a matter of minutes versus a greater length of time of up to as much as multiple days since manual intervention may not be needed. Accordingly, overall performance of VM instances may be improved.

Figure 9:
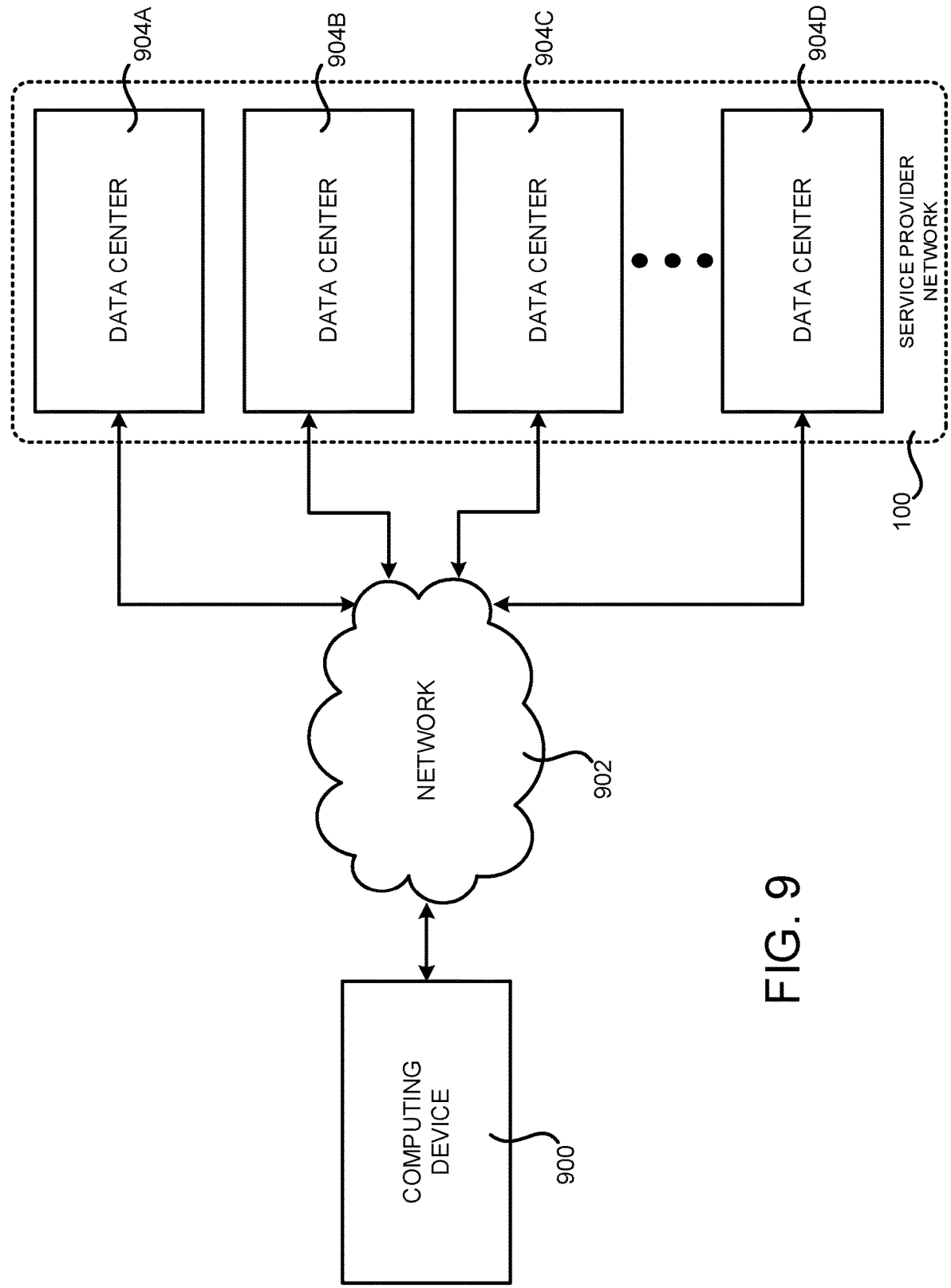
FIG. 9 is a system and network diagram that illustrates an illustrative operating environment that includes a service provider network that can be configured to implement aspects of the functionality described herein.

FIG. 9 is a system and network diagram that illustrates one illustrative operating environment for the configurations disclosed herein that includes a service provider network 100 that can be configured to execute the on-demand computing service 102, the health checker service 104, the screenshot service 106, the recognition service 108 and the data store service 110 in the manner described above, according to one configuration disclosed herein. As discussed above, the service provider network 100 can execute network services that provide computing resources on a permanent or an as-needed basis. Among other types of functionality, the computing resources provided by the service provider network 100 can be utilized to implement the various network services described herein. As also discussed above, the computing resources provided by the service provider network 100 can be data processing resources, such as VM instances, data storage resources, networking resources, data communication resources, network services, and other types of resources.

Each type of computing resource provided by the service provider network 100 can be general-purpose or can be available in a number of specific configurations. For example, data processing resources can be available as physical computers or VM instances, e.g., VM instances 112, in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

As also discussed above, the computing resources provided by the service provider network 100 are enabled in one implementation by one or more data centers 904A-904D

(which might be referred to herein singularly as "a data center 904" or collectively as "the data centers 904"). The data centers 904 are facilities utilized to house and operate computer systems and associated components. The data centers 904 typically include redundant and backup power, communications, cooling, and security systems. The data centers 904 can also be located in geographically disparate locations. One illustrative configuration for a data center 904 that can be utilized to implement the technologies disclosed herein will be described below with regard to FIG. 10.

The users of the service provider network 100 can access the computing resources provided by the service provider network 100 over a network 902, which can be a wide area communication network ("WAN"), such as the Internet, an intranet or an Internet service provider ("ISP") network or a combination of such networks. For example, and without limitation, a computing device 900 operated by a user of the service provider network 100, such as the user 114 and the user computing device 116, can be utilized to access the service provider network 100 by way of the network 902. It should be appreciated that a local-area network ("LAN"), the Internet, or any other networking topology known in the art that connects the data centers 904 to remote customers and other users can be utilized. It should also be appreciated that combinations of such networks can also be utilized.

Figure 10:
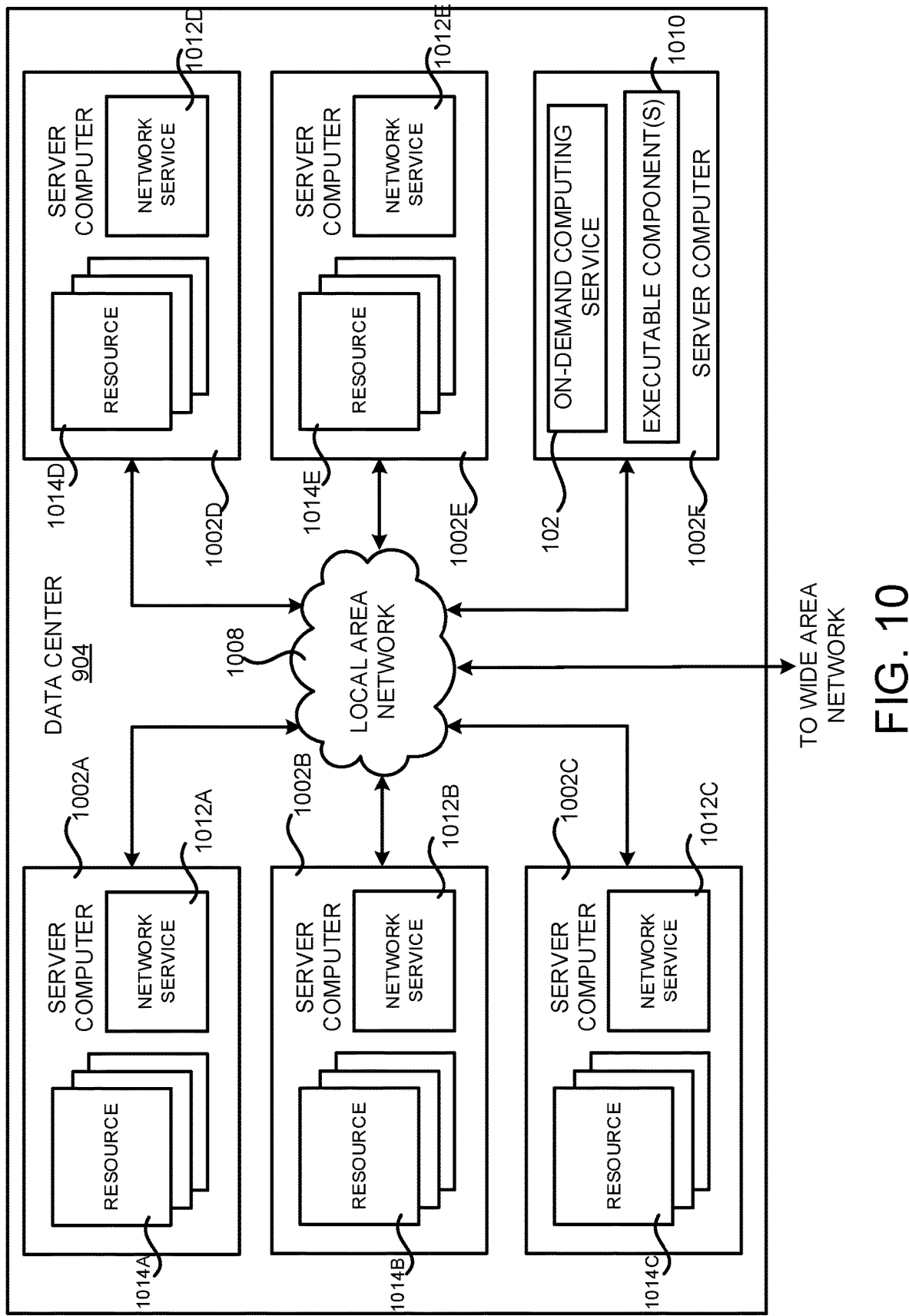
FIG. 10 is a computing system diagram illustrating a configuration for a data center that can be utilized to implement aspects of the technologies disclosed herein.

FIG. 10 is a computing system diagram that illustrates one configuration for a data center 904 that can be utilized to implement the on-demand computing service 102, the health checker service 104, the screenshot service 106, the recognition service 108 and the data store service 110, as well as other network services. The example data center 904 illustrated in FIG. 10 includes several server computers 1002A-1002F (which might be referred to herein singularly as "a server computer 1002" or in the plural as "the server computers 1002") for providing the computing resources 1014A-10141.

The server computers 1002 can be standard tower, rack-mount, or blade server computers configured appropriately for providing the various computing resources described herein (illustrated in FIG. 10 as the computing resources 1014A-1014E). As mentioned above, the computing resources 1014 provided by the service provider network 100 can be data processing resources such as VM instances, e.g., VM instances 112 or hardware computing systems, data storage resources, database resources, networking resources, and others. Some of the servers 902 can also be configured to execute network services 1012A-1012E, respectively, capable of instantiating, providing and/or managing the computing resources 1014A-1014E, some of which are described in detail below with regard to FIG. 11.

The data center 904 illustrated in FIG. 10 also includes a server computer 1002F that can execute some or all of the software components described above. For example, and without limitation, the server computer 1002F can be configured to execute the on-demand computing service 102, which has been described in detail above. The server computer 1002F can also be configured to execute other components and/or to store data for providing some or all of the functionality described herein. For example, the server computer 1002F can also be configured to execute other components related to the health checker service 104, the screenshot service 106, the recognition service 108 and the data store service 110. In this regard, it should be appreciated that components (e.g., executable components 1010) or different instances of the server computer 1002F can execute on many other physical or virtual servers in the data centers 904 in various configurations.

In the example data center 904 illustrated in FIG. 10, an appropriate LAN 1008 is also utilized to interconnect the server computers 1002A-1002F. The LAN 1008 is also connected to the network 402 illustrated in FIG. 9. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 904A-904D, between each of the server computers 1002A-1002F in each data center 904, and, potentially, between computing resources 1014 in each of the data centers 904. It should be appreciated that the configuration of the data center 904 described with reference to FIG. 10 is merely illustrative and that other implementations can be utilized.

Figure 11:
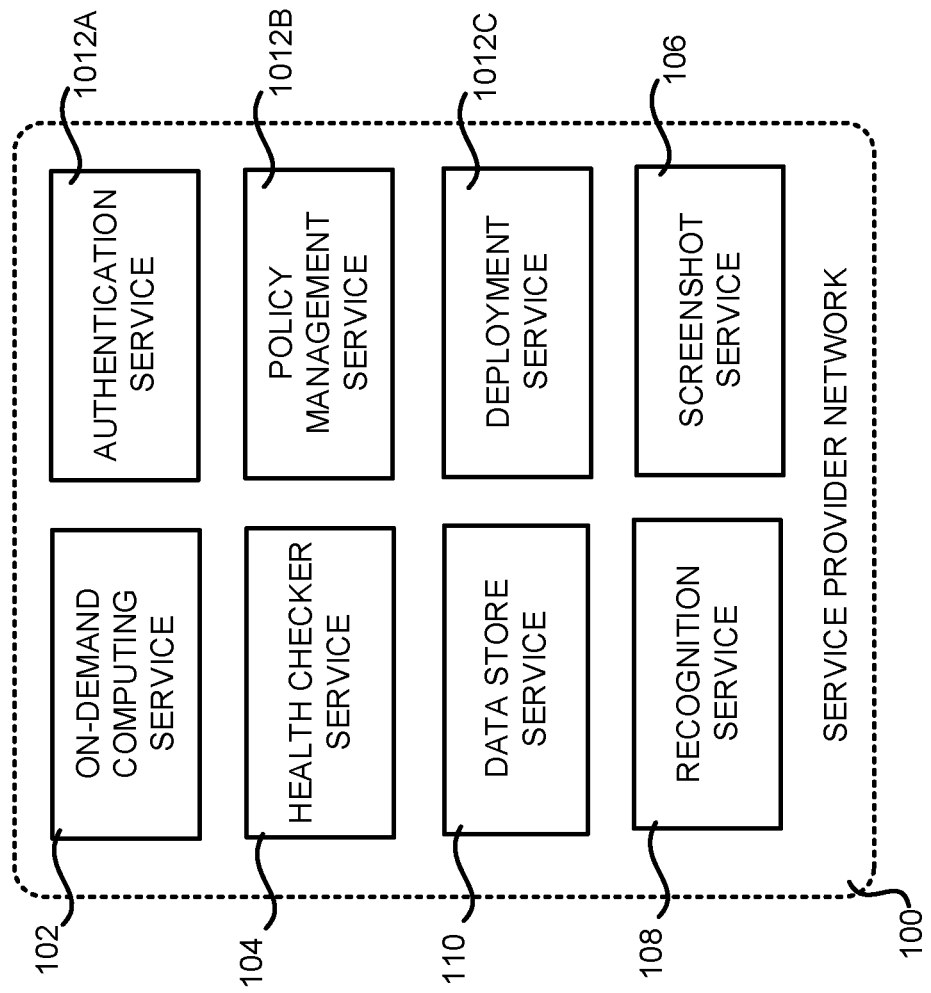
FIG. 11 is a network services diagram that illustrates aspects of several services that can be provided by and utilized within a service provider network configured to implement the various technologies disclosed herein.

FIG. 11 is a system and network diagram that illustrates aspects of several network services 1012 that can be provided by and utilized within a service provider network 100 in one configuration disclosed herein. In particular, and as discussed above, the service provider network 100 can provide a variety of network services 1012 to customers and other users of the service provider network 100 including, but not limited to, the on-demand computing service 102, the health checker service 104, the data store service 110 (which can implement the data store 124), the recognition service 108, an authentication service 1012A, a policy management service 1012B, a deployment service 1012C, and the screenshot service 106. Additionally, the service provider network 100 can also provide other types of network services, some of which are also described in greater detail below.

It should be appreciated that customers of the service provider network 100 can include organizations or individuals that utilize some or all of the services 1012 provided by the service provider network 100. As described above, a customer or other user can communicate with the service provider network 100 through a network, such as the network 902 illustrated in FIG. 9. Communications from a customer computing device, such as the user computing device 116 illustrated in FIG. 1, to the service provider network 100 can cause the services provided by the service provider network 100 to operate in accordance with the described configurations or variations thereof.

It is noted that not all configurations described include the network services 1012 illustrated in FIG. 11 and that additional network services 1012 can be provided in addition to or as an alternative to the services 1012, as well as the on-demand computing service 102, the health checker service 104, the data store service 110, the recognition service 108, and the screenshot service 106, explicitly described herein. Each of the services illustrated in FIG. 11 can also expose web service interfaces that enable a caller to submit appropriately configured application programming interface ("API") calls to the various services through web service requests. The various web services can also expose GUIs, command line interfaces ("CLIs"), and/or other types of interfaces for accessing the functionality that they provide. In addition, each of the services can include service interfaces that enable the services to access each other (e.g., to enable a VM instance 112 provided by the on-demand computing service 102 to store data in or retrieve data from the data store service 110). Additional details regarding some of the services illustrated in FIG. 11 will now be provided.

As discussed above, the on-demand computing service 102 can be a collection of computing resources configured to instantiate VM instances 112 and to provide other types of computing resources 1014 on demand. For example, a customer or other user of the service provider network 100 can interact with the on-demand computing service 102 (via appropriately configured and authenticated API calls, for example) to provision and operate VM instances 112 that are instantiated on physical computing devices hosted and operated by the service provider network 100. The VM instances 112 can be used for various purposes, such as to operate as servers supporting the network services described herein, a web site, to operate business applications or, generally, to serve as computing resources for the customer.

Other applications for the VM instances 112 can be to support database applications, electronic commerce applications, business applications and/or other applications. Although the on-demand computing service 102 is illustrated in FIG. 11, any other computer system or computer system service can be utilized in the service provider network 100 to implement the functionality disclosed herein, such as a computer system or computer system service that does not employ virtualization and instead provisions computing resources on dedicated or shared computers/servers and/or other physical devices.

The data store service 110 can include software and computing resources that collectively operate to store data using block or file-level storage devices (and/or virtualizations thereof). The storage devices of the data store service 110 can, for example, be operationally attached to virtual computer systems provided by the on-demand computing service 102 to serve as logical units (e.g., virtual drives) for the computer systems. A storage device can also enable the persistent storage of data used/generated by a corresponding virtual computer system where the virtual computer system service can only provide ephemeral data storage.

As illustrated in FIG. 11 and discussed above, the service provider network 100, in various configurations, also includes an authentication service 1012A and a policy management service 1012B. The authentication service 1012A, in one example, is a computer system (i.e., collection of computing resources 1014) configured to perform operations involved in authentication of users. For instance, one of the services illustrated in FIG. 11 can provide information from a user to the authentication service 1012A to receive information in return that indicates whether or not the requests submitted by the user are authentic.

The policy management service 1012B, in one example, is a network service configured to manage policies on behalf of customers or internal users of the service provider network 100. The policy management service 1012B can include an interface that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The service provider network 100 can additionally maintain other services 1012 based, at least in part, on the needs of its customers. For instance, the service provider network 100 can maintain a deployment service 1012C for deploying program code and/or the data store service 110 in some configurations. The deployment service 1012C provides functionality for deploying program code, such as to virtual or physical hosts provided by the on-demand computing service 102. As also discussed briefly above, the data store service 110 can be a collection of computing resources that collectively operate to create, maintain, and allow queries to be performed on databases stored within the service provider network 100. For example, a user of the service provider network 100 can operate and manage a data store provided by the data store service 110 by utilizing appropriately configured network API calls. This, in turn, can allow the customer to maintain and potentially scale the operations in the data store. Other services include object-level archival data storage services, and services that manage, monitor, interact with, or support other services. The service provider network 100 can also be configured with other network services not specifically mentioned herein in other configurations.

Figure 12:
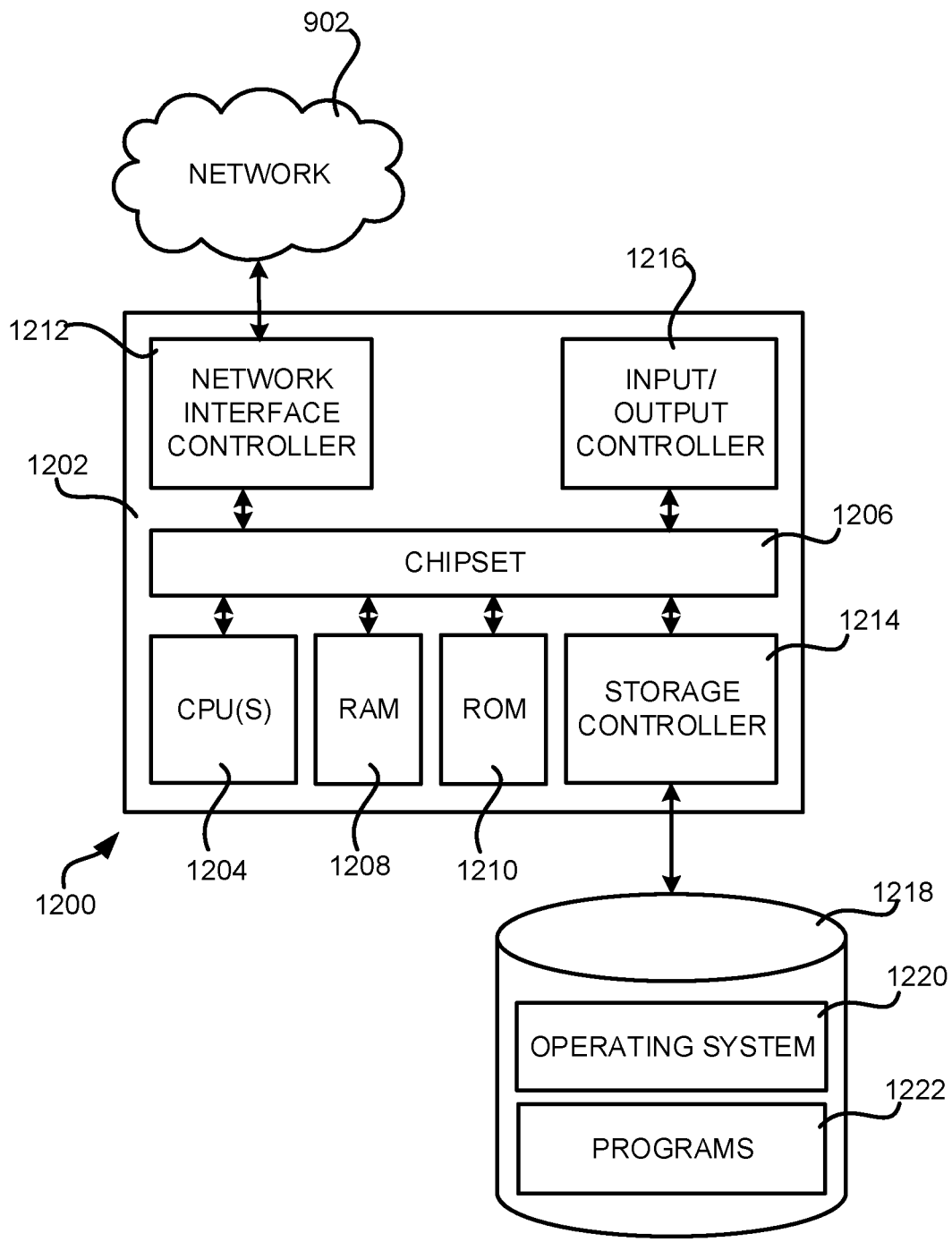
FIG. 12 is a computer architecture diagram illustrating an illustrative computer hardware architecture for implementing a computing device that can be utilized to implement aspects of the various technologies presented herein.

FIG. 12 illustrates an example computer architecture for a computer 1200 capable of executing program components for implementing the functionality described above. The computer architecture illustrated in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 902. The chipset 1206 can include functionality for providing network connectivity through a NIC 1212, such as a gigabit Ethernet adapter. The MC 1212 is capable of connecting the computer 1200 to other computing devices over the network 902. It should be appreciated that multiple NICs 1212 can be present in the computer 1200, connecting the computer to other types of networks and remote computer systems.

The computer 1200 can be connected to a mass storage device 1218 that provides non-volatile storage for the computer. The mass storage device 1218 can store an operating system 1220, programs 1222, and data, which have been described in greater detail herein. The mass storage device 1218 can be connected to the computer 1200 through a storage controller 1214 connected to the chipset 1206. The mass storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1218 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1218 is characterized as primary or secondary storage, and the like.

For example, the computer 1200 can store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1218 by detecting the physical states or characteristics of one or more particular locations within the physical storage units.

In addition to the mass storage device 1218 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 can store an operating system 1220 utilized to control the operation of the computer 1200. According to one configuration, the operating system comprises the LINUX operating system or one of its variants such as, but not limited to, UBUNTU, DEBIAN, and CENTOS. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 1218 can store other system or application programs and data utilized by the computer 1200.

In one configuration, the mass storage device 1218 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above with regard to FIGS. 1-8. The computer 1200 can also include computer-readable storage media for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, a plotter, or other type of output device. It will be appreciated that the computer 1200 might not include all of the components illustrated in FIG. 12, can include other components that are not explicitly illustrated in FIG. 12, or can utilize an architecture completely different than that illustrated in FIG. 12.

Based on the foregoing, it should be appreciated that technologies for troubleshooting a VM instance that has entered a non-responsive or "bad" state, e.g., the VM instance is unreachable, have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method in a service provider network, the method comprising:

determining, by a health checker service, that a virtual machine instance provided by an on-demand computing service is in a non-responsive state;

obtaining, by the health checker service from a screenshot service, a screenshot image;

providing, by the health checker service, the screenshot image to a recognition service;

evaluating, by the recognition service, the screenshot image with respect to a plurality of reference screenshot images, wherein the reference screenshot images relate to possible screenshots for a display of a computing device;

matching, by the recognition service, the screenshot image with a reference screenshot image of the plurality of reference screenshot images;

providing, by the recognition service, a type of the screenshot image to the health checker service;

based at least in part on the type of the screenshot image, confirming, by the health checker service, that the virtual machine instance is in the non-responsive state by:

obtaining multiple screenshot images over a period of time based at least in part on the type of the screenshot image;

determining a history of the multiple screenshot images; and based at least in part on the history of the multiple screenshot images, confirming that the virtual machine instance is in the non-responsive state;

determining, by the health checker service, a potential problem associated with the type of the screenshot image;

determining, by the health checker service, a corrective action that is to cause the virtual machine instance to change from the non-responsive state to a responsive state, the corrective action being based on the potential problem associated with the type of the screenshot image; and causing, by the health checker service, the corrective action to be performed.

2. The computer-implemented method of claim 1, wherein:

the screenshot image is a first screenshot image;

the potential problem comprises first and second potential problems; and causing the corrective action to be performed comprises:

causing a first corrective action to be performed based upon the first potential problem;

obtaining, by the health checker service from the screenshot service, a second screenshot image;

providing, by the health checker service, the second screenshot image to the recognition service;

determining, by the recognition service, that the second screenshot image matches the reference screenshot image;

causing a second corrective action to be performed based upon the second potential problem;

obtaining, by the health checker service from the screenshot service, a third screenshot image;

providing, by the health checker service, the third screenshot image to the recognition service;

determining, by the recognition service, that the third screenshot image does not match the reference screenshot image; and determining, by the health checker service, that the virtual machine instance is in a responsive state based upon the third screenshot image not matching the reference screenshot image.

3. The computer-implemented method of claim 1, wherein causing the corrective action to be performed comprises:

gathering data associated with circumstances related to the virtual machine instance entering the non-responsive state; and storing the data in a data store.

4. The method of claim 1, wherein the corrective action comprises:

rebooting the virtual machine instance.

5. The method of claim 1, wherein the screenshot image is an image of a virtual desktop system running on the virtual machine instance.

6. A system, comprising:

one or more processors; and a non-transitory computer-readable storage medium having instructions stored thereupon which, when executed by the one or more processors, cause the system to:

determine that a virtual machine instance is in a non-responsive state;

obtain a screenshot image from the virtual machine instance;

evaluate the screenshot image to determine a type of the screenshot image;

based at least in part on the type of the screenshot image, confirm that the virtual machine instance is in the non-responsive state by:

obtaining multiple screenshot images over a period of time based at least in part on the type of the screenshot image;

determining a history of the multiple screenshot images; and based at least in part on the history of the multiple screenshot images, confirming that the virtual machine instance is in the non-responsive state;

determine a potential problem associated with the type of the screenshot image;

determine a corrective action that is to cause the virtual machine instance to change from the non-responsive state to a responsive state, the corrective action being based on the potential problem associated with the type of the screenshot image; and cause the corrective action to be performed.

7. The system of claim 6, wherein evaluate the screenshot image to determine the type of the screenshot image comprises:

matching the screenshot image with a reference screenshot image of a plurality of reference screenshot images to determine the type of the screenshot image.

8. The system of claim 7, wherein:

the screenshot image is a first screenshot image; and the instructions, when executed by the one or more processors, cause the system to:

determine first and second potential problems related to the type of the first screenshot image; and cause the corrective action to be performed by:

causing a first corrective action to be performed based upon the first potential problem;

obtaining a second screenshot image;

determining that the second screenshot image matches the reference screenshot image;

causing a second corrective action to be performed based upon the second potential problem;

obtaining a third screenshot image;

determining that the third screenshot image does not match the reference screenshot image; and determining that the virtual machine instance is in a responsive state based upon the third screenshot image not matching the reference screenshot image.

9. The system of claim 6, wherein the corrective action comprises:

gathering data associated with circumstances related to the virtual machine instance entering the non-responsive state; and storing the data in a data store.

10. The system of claim 6, wherein the corrective action comprises providing a notification to a person about a potential problem associated with the type of the screenshot image.

11. The system of claim 6, wherein the instructions, when executed by the one or more processors, cause the system to:

reboot the virtual machine instance.

12. The system of claim 7, wherein the instructions, when executed by the one or more processors, cause the system to:

delay causing the corrective action to be performed until after a predetermined amount of time after matching the screenshot image with the reference screenshot image.

13. A non-transitory computer-readable storage medium having instructions stored thereupon which are executable by one or more processors and which, when executed, cause the one or more processors to:

determine that a virtual machine instance is in a non-responsive state;

obtain a screenshot image generated by the virtual machine instance;

evaluate the screenshot image to determine a type of the screenshot image;

based at least in part on the type of the screenshot image, confirm that the virtual machine instance is in the non-responsive state by:

obtaining multiple screenshot images over a period of time based at least in part on the type of the screenshot image;

determining a history of the multiple screenshot images; and based at least in part on the history of the multiple screenshot images, confirming that the virtual machine instance is in the non-responsive state;

determine a potential problem associated with the type of the screenshot image;

determine a corrective action that is to cause the virtual machine instance to change from the non-responsive state to a responsive state, the corrective action being based on the potential problem associated with the type of the screenshot image; and cause the corrective action to be performed.

14. The non-transitory computer-readable storage medium of claim 13, wherein the instructions, when executed by the one or more processors, cause the one or more processors to:

obtain instance console output data related to the virtual machine instance;

evaluate the instance console output data; and cause the corrective action to be performed based upon the type of the screenshot image and the instance console output data.

15. The non-transitory computer-readable storage medium of claim 13, wherein the corrective action comprises:

gathering data associated with circumstances related to the virtual machine instance entering the non-responsive state; and storing the data in a data store.

16. The non-transitory computer-readable storage medium of claim 13, wherein the instructions, when executed by the one or more processors, cause the one or more processors to:

reboot the virtual machine instance.

17. The non-transitory computer-readable storage medium of claim 13, wherein the screenshot image is an image of a virtual desktop system running on the virtual machine instance.

18. The non-transitory computer-readable storage medium of claim 13, wherein evaluate the screenshot image to determine the type of the screenshot image comprises:

matching the screenshot image with a reference screenshot image of a plurality of reference screenshot images to determine the type of the screenshot image.

19. The non-transitory computer-readable storage medium of claim 13, wherein the corrective action comprises providing a notification to a person about a potential problem associated with the type of the screenshot image.

20. The non-transitory computer-readable storage medium of claim 18, wherein the instructions, when executed by the one or more processors, cause the one or more processors to:

delay causing the corrective action to be performed until after a predetermined amount of time after matching the screenshot image with the reference screenshot image.

* * * * *